(12) United States Patent
Fendeleur et al.

(10) Patent No.: US 8,757,825 B2
(45) Date of Patent: Jun. 24, 2014

(54) CONTROL DEVICE WITH ROTARY SWITCH BACK-LIT BY A LIGHT GUIDE

(75) Inventors: Laurence Fendeleur, Souffel Weyersheim (FR); Alexandre Uhl, Illkirch (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/635,451

(22) PCT Filed: Mar. 9, 2011

(86) PCT No.: PCT/EP2011/053567
§ 371 (c)(1),
(2), (4) Date: Oct. 15, 2012

(87) PCT Pub. No.: WO2011/113733
PCT Pub. Date: Sep. 22, 2011

(65) Prior Publication Data
US 2013/0229783 A1    Sep. 5, 2013

(30) Foreign Application Priority Data
Mar. 17, 2010  (FR) .................................... 10 51888

(51) Int. Cl.
*G01D 11/28*  (2006.01)
(52) U.S. Cl.
USPC .................. 362/23.22; 362/23.21; 362/23.04; 362/23.07; 362/23.09; 362/23.01; 362/23.13; 116/286; 116/287; 116/288
(58) Field of Classification Search
USPC ............... 362/23.15, 32.21, 23.18, 23.01, 23, 362/23.16, 23.17, 23.21, 23.22, 23.04, 362/23.05, 23.07, 23.09, 23.1, 23.12, 23.13, 362/23.14, 23.19; 116/286–288, 202, 116/DIG. 36
See application file for complete search history.

(56) References Cited

U.S. PATENT DOCUMENTS

| 5,093,764 A | 3/1992 | Hasegauwa et al. |
| 5,504,661 A * | 4/1996 | Szpak .............. 362/30 |
| 5,913,414 A * | 6/1999 | Pollock et al. ................ 200/316 |
| 6,224,221 B1 | 5/2001 | Glienicke |
| 6,394,619 B1 * | 5/2002 | Snider ............. 362/30 |
| 6,667,446 B1 | 12/2003 | Schuberth et al. |
| 6,860,224 B2 * | 3/2005 | Snider ........................ 116/310 |
| 2002/0097569 A1 | 7/2002 | Liao et al. |

FOREIGN PATENT DOCUMENTS

| DE | 4222335 | 1/1994 |
| DE | 10041875 | 3/2002 |
| EP | 0976972 | 2/2000 |
| EP | 1102294 | 5/2001 |
| WO | 2005/026664 | 3/2005 |

OTHER PUBLICATIONS

International Search Report dated Apr. 6, 2011.

* cited by examiner

*Primary Examiner* — Nimeshkumar Patel
*Assistant Examiner* — Jose M Diaz
(74) *Attorney, Agent, or Firm* — J. Gordon Lewis

(57) ABSTRACT

A control device, in particular for a motor vehicle, including a rotary switch and a peripheral display zone which are arranged on a board and which are back-lit by a back-lighting device, the rotary switch including a knob which is mounted in rotation relative to the board about an axis, the knob being provided with an illuminated pointer turning with the knob, the peripheral display zone including fixed illuminated symbols arranged around the rotary switch, characterized by the fact that the back-lighting device includes at least one light source which cooperates with a light guide lighting both the illuminated pointer and the peripheral display zone.

12 Claims, 4 Drawing Sheets

CONTROL DEVICE WITH ROTARY SWITCH BACK-LIT BY A LIGHT GUIDE

TECHNICAL FIELD

The present invention relates to a control device with a rotary switch in particular designed to be fitted to a control panel of a motor vehicle, for example to control the functions of an air-conditioning and ventilation system.

TECHNOLOGICAL BACKGROUND OF THE INVENTION

Generally the air-conditioning and ventilation system of a motor vehicle includes a control panel provided with a plurality of rotary switches arranged on a board. These rotary switches are designed to control different functions, in particular the heating temperature, the fan speed, the orientation of the airflows blown into the passenger space of the vehicle by manipulating a rotary knob. Each rotary switch is at least partially surrounded by a peripheral display zone comprising symbols linked to the controlled functions and identifying different angular positions of the rotary switch.

For practical and aesthetic reasons, a back-lighting device is provided to permit the illumination of each rotary switch, in particular the illumination of the pointer which is arranged on the knob and which marks the angular position of the rotary switch, as well as the illumination of the peripheral display zone.

To increase the number of functions controlled by the same control device, provision is often made to arrange at the centre of the rotary switch one or more push-buttons which also include a back-lighting device.

Currently, to form such a type of rotary switch including at least one push-button at its centre, a tubular rotary encoder is used which is mounted on the board and which provides both an electrical switching function and a haptic, or force-feedback ("feeling") function. The haptic function in particular allows the user to identify a defined number of angular positions in the form of indexing notches.

A disadvantage of this type of rotary switch is that its diameter is restricted, since it depends on the rotary encoder selected. The same is true of the haptic function which is determined at the design stage by the manufacturer of the rotary encoder. This type of rotary switch does not therefore allow the designer of the control panel to adapt the diameter and the haptic function to particular requirements of the constructor of the vehicle.

Regarding the back-lighting device, the current solutions generally require a large number of electroluminescent diodes ("LEDs"), a part of these being arranged under the symbols of the peripheral display zone, while another part is arranged under the rotary switch, at different angular positions, to illuminate the illuminated pointer in its different angular positions. These solutions are not completely satisfactory as they present problems of the space they occupy on the board and problems of overheating due to the thermal energy produced by the large number of light sources. In particular, the back-lighting of the illuminated pointer and of the illuminated tell-tale with which the push-button at the centre of the rotary switch is provided is very difficult to integrate due to the small amount of space available at the centre and under the rotary switch.

SUMMARY OF THE INVENTION

The present invention is intended to propose an economical solution to the problems mentioned above.

To this end, the invention proposes a control device, in particular for a motor vehicle, including a board, a rotary switch and a peripheral display zone which are arranged on the board, and a back-lighting device designed to back-light the rotary switch and the peripheral display zone, the rotary switch including a knob which is mounted in rotation relative to the board about an axis, the knob being provided with an illuminated pointer rotating with the knob, the peripheral display zone including fixed illuminated symbols arranged around the rotary switch, characterised by the fact that the back-lighting device includes at least one light source which cooperates with a light guide lighting both the illuminated pointer and the peripheral display zone, the light guide being made in one piece and fixed on the board.

By means of the invention, it is possible to provide wide diversity to the vehicle manufacturer in control devices in terms of dimension of the rotary switches (height, diameter) and in terms of dimension and number of push-buttons at the centre of the rotary switches.

In addition, the invention allows the haptic function to be disassociated from the back-lighting function by dispensing with the use of standard rotary encoders. The invention therefore permits personalisation of each rotary switch, in particular as regards back-lighting, haptic function, diameter, etc.

The level of luminous intensity and luminous homogeneity provided by the back-lighting device according to the invention is mainly determined by the selection of the optical guide, in particular the selection of its material, its surface appearance, its shape, which allows a large variety of appearances for the control device in accordance with the invention.

In accordance with other advantageous characteristics of the invention:

the peripheral display zone is back-lit by a generally transversal portion of the light guide;

the light source is transversally offset relative to the rotary switch and relative to the peripheral display zone, and the light guide includes a guiding portion which extends from the light source to a peripheral edge of the transversal portion;

the control device includes two light sources, and the guiding portion includes two branches which each extend from the peripheral edge of the transversal portion to the associated light source;

the transversal portion is arranged above the board so as to provide an axial space;

the guiding portion includes an inclined portion between the light source, which is generally situated at the level of the board, and the peripheral edge of the transversal portion;

a movable electrical switching device, linked in rotation to the knob, is arranged in the axial space so as to produce a switching signal dependent on the angular position of the knob;

the light guide has generally the form of a strip which includes an input surface designed to allow propagation of the light emitted by the source in the plane of the strip, and at least one transversal face of the transversal portion is provided with relief structures intended to diffuse a part of the light which is propagated in the transversal portion towards the outside of the light guide towards the fixed illuminated symbols of the peripheral display zone;

the light guide includes an axial portion which extends inside the knob towards the pointer, from the internal peripheral edge of the transversal portion, so as to back-light the pointer;

the axial portion extends over an angular sector about the axis of rotation, the said angular sector generally corresponding to the maximum angular amplitude of displacement of the illuminated pointer;

the axial portion is formed of a plurality of axial tongues which extend in an arc of circle about the axis of rotation;

an intermediate element forming a light guide is arranged in the knob in such a manner as to guide the light emanating from the axial portion to the illuminated pointer;

the rotary switch includes at least one push-button which is arranged in an annular space defined by the knob and which cooperates with a push-button switch arranged on the board;

the rotary switch includes a tubular body which is linked in rotation to the knob, the transversal portion extends around the tubular body along an angular sector the ends of which define an angular space, and a mechanical connection between the tubular body and a mechanical element mounted on the board is arranged in the angular space;

the mechanical element is a toothed wheel which cooperates with toothing arranged on the tubular body;

the mechanical element is an elastically flexible strip which cooperates with a cam surface arranged on the tubular body in such a manner as to produce a force-feedback on the knob.

BRIEF DESCRIPTION OF THE DRAWINGS

Other characteristics, aims and advantages of the invention will become apparent on reading the following detailed description, and with reference to the attached drawings given by way of non-limiting example and in which.

DESCRIPTION OF THE PREFERRED EMBODIMENTS

In the remainder of the description, identical or similar elements will be designated by the same references.

Figure 1:
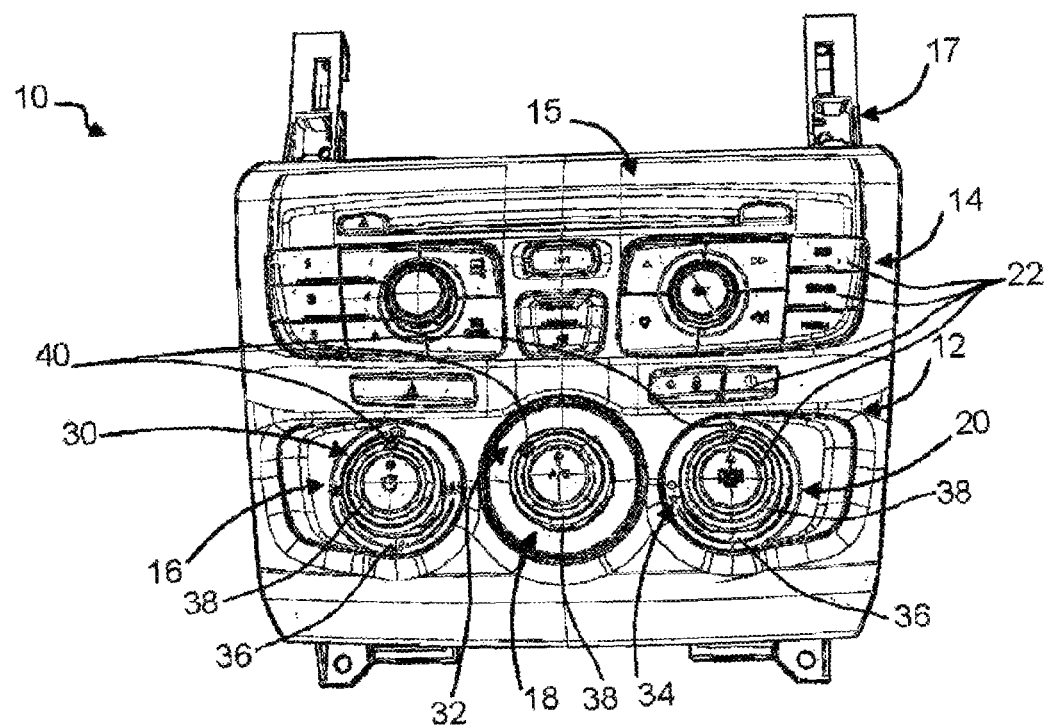
FIG. 1 is a frontal view showing a control panel including a control device in accordance with the teachings of the invention and equipped with two lateral rotary switches and a central rotary switch.
Figure 2:
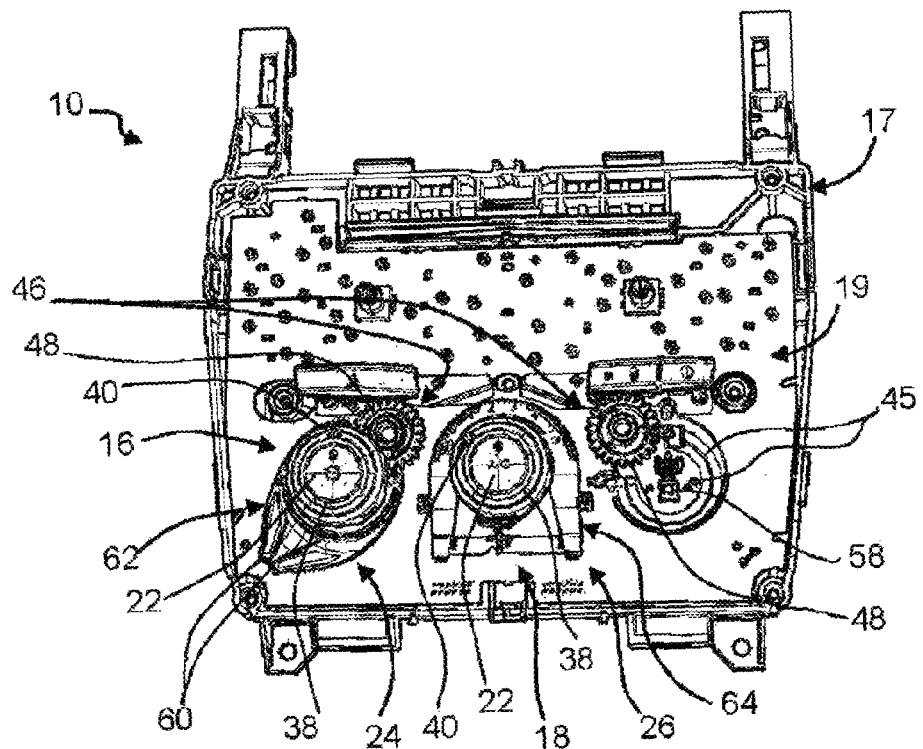
FIG. 2 is a view similar to that of FIG. 1 which shows the control panel of FIG. 1 without its front panel so as to show the back-lighting devices with which the left lateral rotary switch and the central rotary switch are equipped.

In FIGS. 1 and 2, a motor vehicle control panel 10 has been shown including a first control device 12 designed to control an air-conditioning and ventilation system, and a second control device 14 designed to control other systems such as a car radio and a navigation system. The control panel 10 is designed to be arranged in the dashboard of the vehicle. It includes a front panel 15, or cover, which is fixed on a support frame 17 in the form of a board. The control devices 12, 14 are mounted on a board 19, here a printed circuit board, which is fixed on the support frame 17, behind the front panel 15. FIG. 2 shows the control panel 10 without the front panel 15 and without the second control device 14.

The control devices 12, 14 are equipped with rotary switches 16, 18, 20 and push-buttons 22, as well as associated back-lighting devices 24, 26, 28. A peripheral display zone 30, 32, 34 is arranged around each rotary switch 16, 18, 20. Each peripheral display zone 30, 32, 34 includes fixed illuminated symbols 36 such as pictograms or other geometric figures which represent the different functions associated with the different angular positions of the rotary switches 16, 18, 20 and which are back-lit. In accordance with the embodiment shown, the peripheral display zones 30, 32, 34 are situated on portions of the front panel 15 which surround the rotary switches 16, 18, 20.

In accordance with the embodiment shown, considering FIGS. 1 and 2, a left lateral rotary switch 16 is intended to control a function of orientation of the airflow of the air-conditioning and ventilation system, a central rotary switch 18 is intended to control the speed of the fan of the air-conditioning and ventilation system, and a right lateral rotary switch 20 is intended to control the heating temperature of the air-conditioning and ventilation system.

Each rotary switch 16, 18, 20 includes an annular knob 38 which is mounted in rotation relative to the board 19 about an axis A1 substantially perpendicular to the board 19. Each knob 38 is provided with a peripheral illuminated pointer 40 which turns with the knob 38 and which is back-lit by the back-lighting device 24, 26, 28 associated with the rotary switch 16, 18, 20. The illuminated pointer 40 allows marking of the active angular position of the knob 38 and of the associated rotary switch 16, 18, 20.

Considering in particular FIGS. 3 to 8, each rotary switch 16, 18, 20 includes a tubular body 42 which is linked in rotation to the knob 38. This tubular body 42 is provided with a transversal arm 44 provided with electrical contact means which cooperate by sliding with conductive electrical tracks 45 arranged on the board 19 so as to form a movable electrical switching device allowing the production of an electrical switching signal which is dependent on the angular position of the knob 38 and which is linked to the function controlled by the rotary switch 16, 18, 20.

In accordance with the embodiment shown in the figures, the lateral rotary switches 16, 20 each include a mechanical geared connection 46 to the ventilation and air-conditioning system to control for example the pivoting of the flaps (not shown). The mechanical connection 46 here includes a toothed wheel 48 which meshes with toothing 50 arranged on the tubular body 42. Moreover, the central rotary switch 18 includes a mechanical haptic device 52 in the form of an elastically flexible strip 54 which is fixed on the board 19 and which cooperates with a notched cam surface 56 arranged on the associated tubular body 42 so as to produce a force-feedback on the knob 38 when it is manually manipulated by a user.

Of course, the haptic device 52 could be formed in a different manner, for example by means of an indexing finger elastically biased against the cam surface 56.

Advantageously, each rotary switch 16, 18, 20 includes a push-button 22 which is arranged in the annular space defined by the knob 38, inside the tubular body 42. The push-button 22 is designed to cooperate with a push-button switch 58 arranged on the board 19 to control for example the starting and stopping of the ventilation and air-conditioning system, or to control the triggering of a particular functioning mode of the ventilation and air-conditioning system such as demisting. Here, each push-button 22 has its own back-lighting device (not shown) distinct from that used for the rotary switch 16, 18, 20.

In accordance with the teachings of the invention, each rotary switch 16, 18, 20 and its associated peripheral display zone 30, 32, 34 are back-lit by the same back-lighting device 24, 26, 28. To this end, each back-lighting device 24, 26, 28 includes at least one light source 60 which cooperates with a light guide 62, 64, 66 lighting both the illuminated pointer 40 and the associated peripheral display zone 30, 32, 34.

The light guides 62, 64, 66 are made from a material having optical properties suitable for the light guiding function. Preferably they are made of plastics material, for example translucent PMMA (methyl polymethacrylate) or PC (polycarbonate). As can be seen in FIGS. 3 to 8, each light guide 62, 64, 66 is made in one piece and is mounted fixed on the board 19.

Advantageously, the light source 60 is transversally offset relative to the associated rotary switch 16, 18, and relative to the associated peripheral display zone 30, 32, 34. It is here formed by an electroluminescent diode which is mounted on the board 19 and which is of the type with lateral light emission so that the light is emitted in a direction generally parallel with the plane of the board 19 towards an input surface 68 of the associated light guide 62, 64, 66.

In accordance with a modified embodiment (not shown), the light source 60 can be a diode of the type with vertical light emission ("top led"). In this case, the form of the light guide 62, 64, 66 and the input surface 68 are suited to the light emission configuration of the diode.

Figure 3:
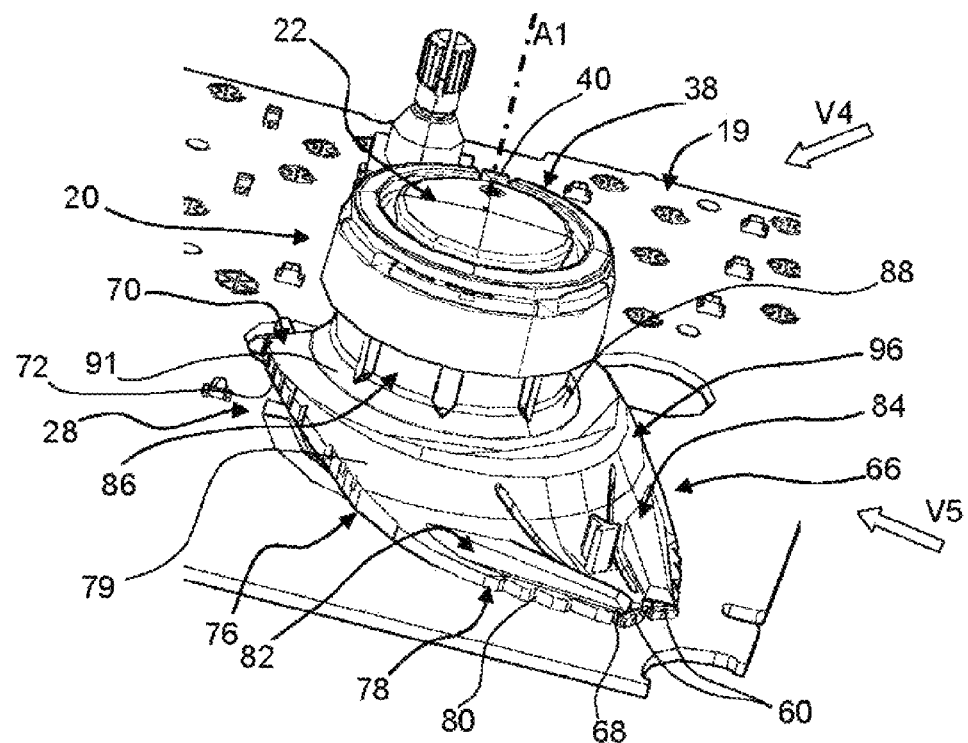
FIG. 3 is a perspective view from the viewpoint V3 of FIG. 4 which shows the right lateral rotary switch of the control panel of FIG. 1 and its back-lighting device.
Figure 4:
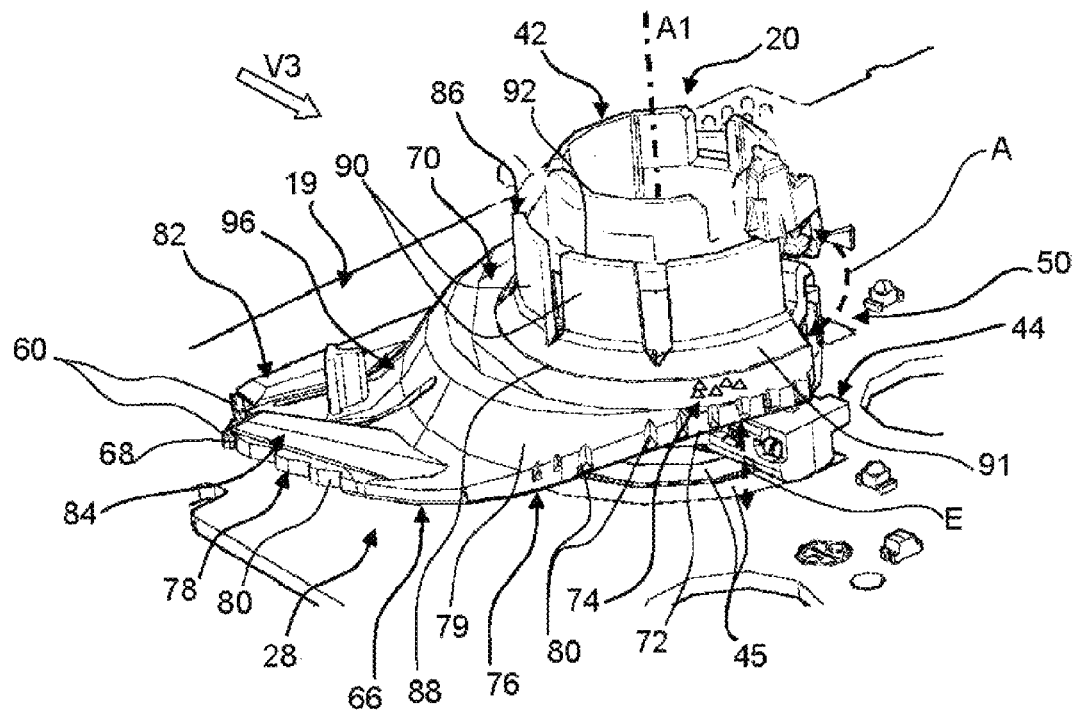
FIG. 4 is a perspective view from the viewpoint V4 of FIG. 3 which shows the right lateral rotary switch of FIG. 3 without its rotary knob.
Figure 5:
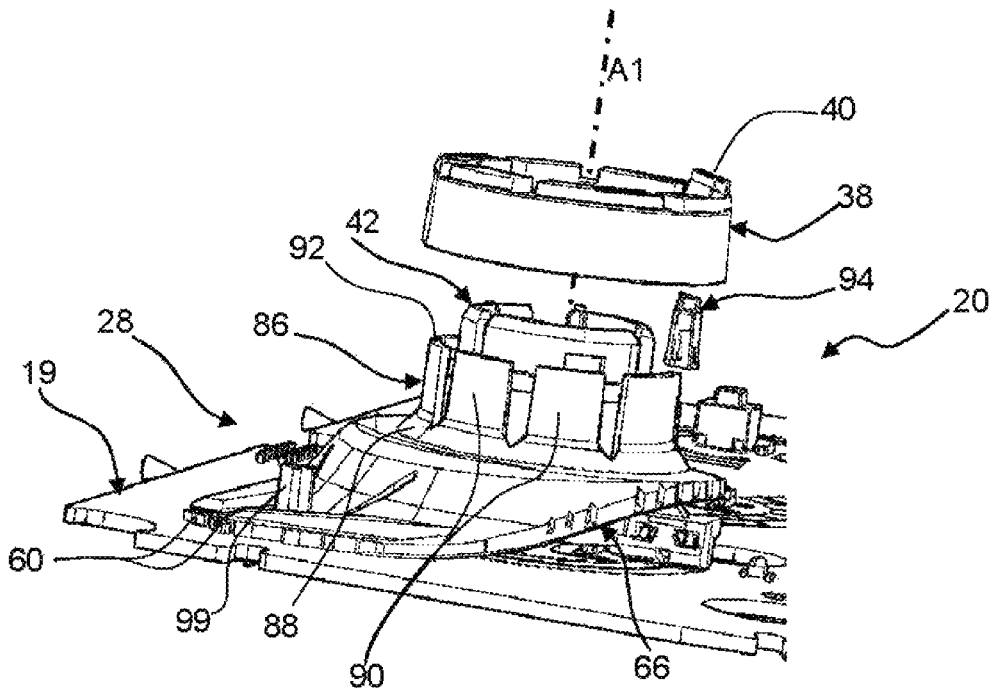
FIG. 5 is a partially exploded perspective view from the viewpoint V5 of FIG. 3 which shows the right lateral rotary switch of FIG. 3.

In the example embodiment shown in the figures, the lateral light guides 62, 66 of the lateral back-lighting devices 24, 28 are formed in accordance with a first embodiment which is shown in detail in FIGS. 3 to 5. The lateral light guides 62, 66 are substantially identical and arranged in generally symmetrical manner relative to an axial plane of symmetry passing through the central rotary switch 18.

Figure 6:
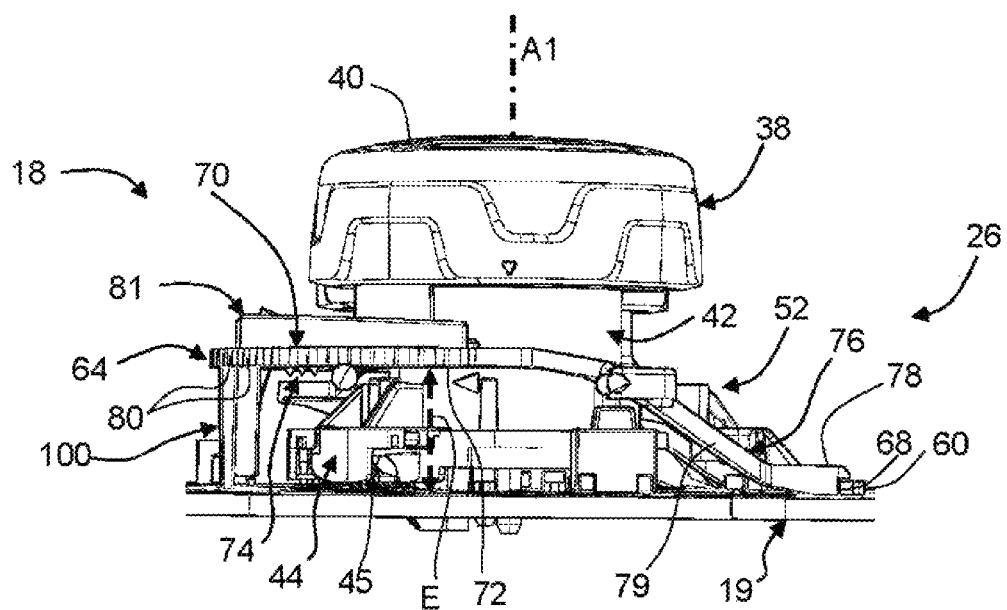
FIG. 6 is a side view which shows the central rotary switch of the control panel of FIG. 1 and its back-lighting device.
Figure 7:
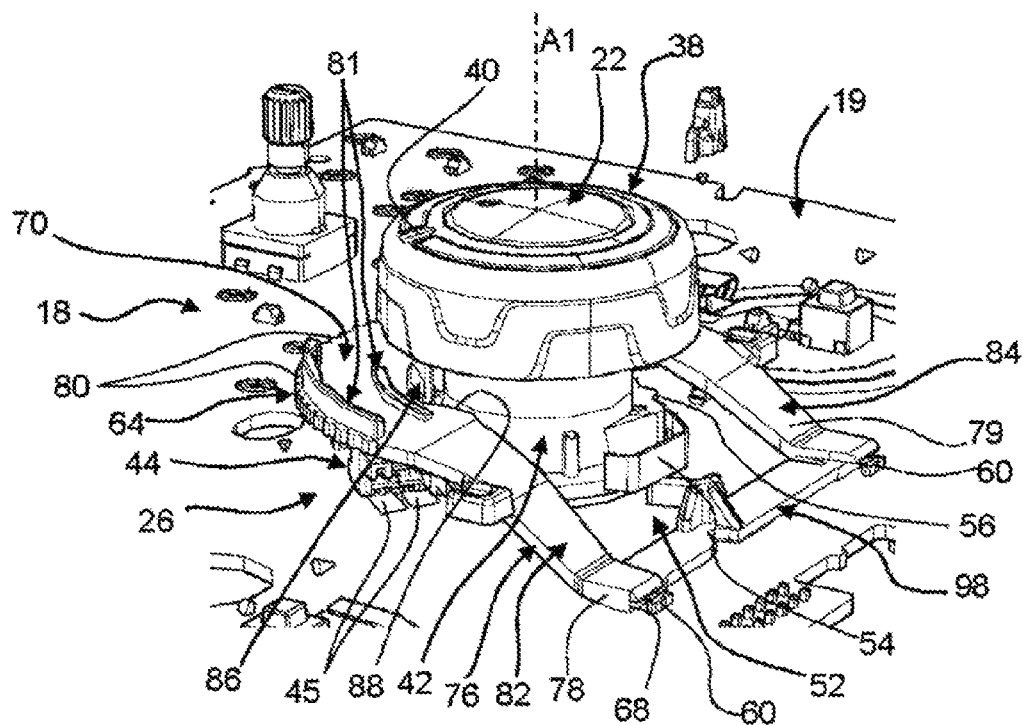
FIG. 7 is a perspective view which shows the central rotary switch of FIG. 6 and its back-lighting device.
Figure 8:
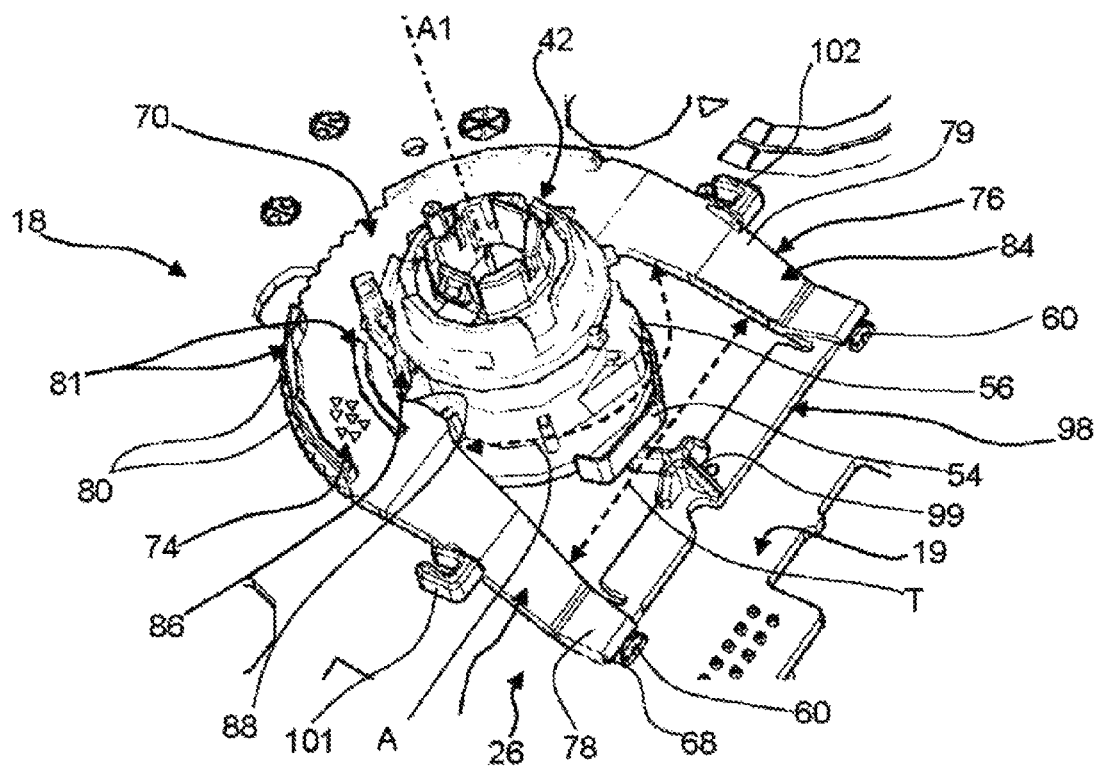
FIG. 8 is a perspective view at a slightly different angle from that of FIG. 7 which shows the central rotary switch of FIG. 6 without its rotary knob.

The central light guide 64 of the central back-lighting device 26 is formed in accordance with a second embodiment which is shown in detail in FIGS. 6 to 8.

In accordance with the teachings of the invention, each light guide 62, 64, 66 has generally the form of a strip which includes an input surface 68 arranged in an edge of the strip and designed to allow propagation of the light emitted by the source 60 in the plane of the strip.

Each light guide 62, 64, 66 includes a generally transversal portion 70 in the form of an annular sector which is designed to back-light the associated peripheral display zone 30, 32, 34. This transversal portion 70 therefore extends under the fixed illuminated symbols 36. To allow this back-lighting, the lower face 72 of the transversal portion 70 includes, in line with the fixed illuminated symbols 36, optical structures 74 in relief which are intended to diffuse a part of the light being propagated in the transversal portion 70 towards the outside of the light guide 62, 64, 66 towards the fixed illuminated symbols 36. The optical structures 74 can be surface roughnesses thus forming reflective micro-facets for the light rays being propagated in the light guide 62, 64, 66. These optical structures 74 can be obtained by moulding during manufacture of the light guide 62, 64, 66 or by a surface treatment applied to the lower face 72. The optical structures 74 are shown in very diagrammatic and in enlarged manner in the figures.

Advantageously, the transversal portion 70 is arranged above the board 19 so as to provide an axial space E between the lower face 72 of the transversal portion 70 and the upper face of the board 19. This allows components to be arranged under the transversal portion 70. In particular, in the present embodiment, the axial space E permits the arrangement and passage of the transversal arm 44 used by the movable electrical switching device associated with the rotary switch 16, 18, 20.

The circumferential ends of the angular sector formed by the transversal portion 70 around the tubular body 42 of the rotary switch 16, 18, 20, allow the freeing of an angular space A in which it is possible to arrange components, such as the mechanical geared connection 46 for the lateral rotary switches 16, 20, and such as the haptic device 52 for the central rotary switch 18.

Each light guide 62, 64, 66 here includes a guiding portion 76 which extends from the light source 60 to a peripheral edge of the transversal portion 70. The guiding portion 76 includes, from the light source 60 to the transversal portion 70, a flat portion 78 arranged on the board 19 and an inclined portion 79 which permit the collection and transmission of the light rays emitted by the source 60 with the best possible efficiency. To improve this efficiency, the peripheral edges of the guiding portion 76 and of the transversal portion 70 include notches 80 optimally distributed to bend the light rays towards the zones most useful for back-lighting and to prevent light losses through the peripheral edges to the maximum extent.

Advantageously, the light guides 62, 64, 66 can include on the transversal portion small walls 81 which are arranged in suitable manner to minimise parasitic light emissions outside the peripheral display zones 30, 32, 34.

To improve the back-lighting efficiency, the light guide 62, 64, 66 preferably includes two light sources 60 and the guiding portion 76 includes two branches 82, 84 which each extend from the peripheral edge of the transversal portion 70 to the associated light source 60.

In accordance with the preferred embodiment of the invention, the light guide 62, 64, 66 includes an axial portion 86 which extends inside the associated knob 38, towards the illuminated pointer 40, from the internal peripheral edge 88 of the transversal portion 70. The internal/external orientation is here defined radially relative to the axis A1. The axial portion 86 is here formed of a plurality of axial tongues 90 which extend in an arc of circle about the axis of rotation A1. Each tongue 90 is joined to the internal peripheral edge 88 of the transversal portion 70 by a joining portion 91 which is curved or inclined so as to ensure to the maximum extent total refraction of the light rays being propagated in the light guide 62, 64, 66 towards the upper end 92 of the axial portion 86.

The axial portion 86 is designed to backlight and illuminate the illuminated pointer 40. To this end, the axial portion 86 extends over an angular sector about the axis of rotation A1, the said angular sector generally corresponding to the maximum angular amplitude of displacement of the illuminated pointer 40, and the illuminated pointer 40 is generally arranged in line with the axial portion 86. To ensure optimal guiding of the light to the illuminated pointer 40, an intermediate light guide 94 in the form of an axial broad is arranged in the knob 38. This intermediate light guide 94 extends generally from the upper axial end 92 of the axial portion 86 to the window which forms the illuminated pointer 40 in the upper part of the knob 38.

The elements will now be described which distinguish the light guides 62, 66 in accordance with the first embodiment from the light guide 64 in accordance with the second embodiment.

In the light guides 62, 66 in accordance with the first embodiment, the two branches 82, 84 meet at the two light sources 60 which are substantially adjacent on the board 19.

In the light guide 64 in accordance with the second embodiment, the two branches 82, 84 are substantially parallel and define a transversal space T, the two associated light sources 60 being relatively distant one from the other on the board 19.

Advantageously, the empty space between the two branches 82, 84 is used for the arrangement of a support and positioning portion 96, 98 which is designed to form a support and a positioning element of the associated light guide 62, 64, 66 on the board 19. Each support and fixing portion 96, 98 is here made in one piece with the body of the associated light guide 62, 64, 66.

In the first embodiment corresponding to the lateral light guides 62, 66, the support and positioning portion 96 extends towards the board from the peripheral edge of the transversal portion 70.

In the second embodiment corresponding to the central light guides 64, the support and positioning portion 98 is formed by a cross-piece which extends transversally between the two flat portions 78 of the branches 82, 84.

Advantageously, each support and positioning portion 96, 98 includes a stud 99 which is received in a complementary housing (not shown) of an intermediate board designed to be mounted, above the light guides 62, 64, 66, between the board 19 and the front panel 15. Thus, each light guide 62, 64, 66 is held in position on the board 19 by the intermediate board. Additionally, the central light guide 64 includes two positioning notches 101, 102 which are made in one piece respectively with the two branches 82, 84 and which are designed to receive in complementary manner two positioning tenons (not shown) arranged on the intermediate board.

In accordance with the preferred embodiment of the central light guide 64, an auxiliary support leg 100 extends under the transversal portion 70, opposite to the support and fixing portion 98, so as to ensure good stability of the central light guide 64 on the board 19.

The invention claimed is:

1. A control device comprising:
   a board;
   a rotary switch and a peripheral display zone which are arranged on the board; and
   a back-lighting device designed to backlight the rotary switch and the peripheral display zone, the rotary switch including a knob which is mounted in rotation relative to the board about an axis, the knob being provided with an illuminated pointer turning with the knob, the peripheral display zone including fixed illuminated symbols arranged around the rotary switch,
   wherein the back-lighting device includes at least one light source which cooperates with a light guide lighting both the illuminated pointer and the peripheral display zone, the light guide being made in one piece and fixed on the board,
   wherein the peripheral display zone is back-lit by a generally transversal portion of the light guide,
   wherein the light source is transversally offset relative to the rotary switch and relative to the peripheral display zone, and by the fact that the light guide includes a guiding portion which extends from the light source to a peripheral edge of the transversal portion, and
   wherein the guiding portion includes an inclined portion between the light source, which is generally situated at the level of the board, and the peripheral edge of the transversal portion.

2. The rotary control device of claim 1, wherein the device includes two light sources, and the guiding portion includes two branches which each extend from the peripheral edge of the transversal portion to the associated light source.

3. The rotary control device of claim 1, wherein the transversal portion is arranged above the board so as to provide an axial space.

4. The rotary control device of claim 3, wherein a movable electrical switching device, linked in rotation to the knob, is arranged in the axial space so as to produce a switching signal dependent on the angular position of the knob.

5. A control device comprising:
   a board;
   a rotary switch and a peripheral display zone which are arranged on the board; and
   a back-lighting device designed to backlight the rotary switch and the peripheral display zone, the rotary switch including a knob which is mounted in rotation relative to the board about an axis, the knob being provided with an illuminated pointer turning with the knob, the peripheral display zone including fixed illuminated symbols arranged around the rotary switch,
   wherein the back-lighting device includes at least one light source which cooperates with a light guide lighting both the illuminated pointer and the peripheral display zone, the light guide being made in one piece and fixed on the board,
   wherein the peripheral display zone is back-lit by a generally transversal portion of the light guide, and
   wherein the light guide has the general form of a strip which includes an input surface designed to allow propagation of the light emitted by the source in the plane of the strip, and by the fact that at least one transversal face of the transversal portion is provided with relief structures intended to diffuse a part of the light which is propagated in the transversal portion towards the outside of the light guide towards the fixed illuminated symbols of the peripheral display zone.

6. A control device comprising:
   a board;
   a rotary switch and a peripheral display zone which are arranged on the board; and
   a back-lighting device designed to backlight the rotary switch and the peripheral display zone, the rotary switch including a knob which is mounted in rotation relative to the board about an axis, the knob being provided with an illuminated pointer turning with the knob, the peripheral display zone including fixed illuminated symbols arranged around the rotary switch,
   wherein the back-lighting device includes at least one light source which cooperates with a light guide lighting both the illuminated pointer and the peripheral display zone, the light guide being made in one piece and fixed on the board,
   wherein the peripheral display zone is back-lit by a generally transversal portion of the light guide, and
   wherein the light guide includes an axial portion which extends inside the knob towards the pointer, from the internal peripheral edge of the transversal portion, so as to back-light the pointer.

7. The rotary control device of claim 6, wherein the axial portion extends over an angular sector about the axis of rotation, the said angular sector generally corresponding to the maximum angular amplitude of displacement of the illuminated pointer.

8. The rotary control device of claim 7, wherein the axial portion is formed of a plurality of axial tongues which extend in an arc of circle about the axis of rotation.

9. The rotary control device of claim 6, wherein an intermediate element forming a light guide is arranged in the knob so as to guide the light emanating from the axial portion to the illuminated pointer.

10. A control device comprising:
a board;
a rotary switch and a peripheral display zone which are arranged on the board; and
a back-lighting device designed to backlight the rotary switch and the peripheral display zone, the rotary switch including a knob which is mounted in rotation relative to the board about an axis, the knob being provided with an illuminated pointer turning with the knob, the peripheral display zone including fixed illuminated symbols arranged around the rotary switch,
wherein the back-lighting device includes at least one light source which cooperates with a light guide lighting both the illuminated pointer and the peripheral display zone, the light guide being made in one piece and fixed on the board,
wherein the peripheral display zone is back-lit by a generally transversal portion of the light guide, and
wherein the rotary switch includes a tubular body which is linked in rotation to the knob, by the fact that the transversal portion extends around the tubular body in an angular sector the ends of which define an angular space, and by the fact that a mechanical connection between the tubular body and a mechanical element mounted on the board is arranged in the angular space.

11. The rotary control device of claim 10, wherein the mechanical element is a toothed wheel which cooperates with toothing arranged on the tubular body.

12. The rotary control device of claim 10, wherein the mechanical element is an elastically flexible strip which cooperates with a cam surface arranged on the tubular body so as to produce a force-feedback on the knob.

* * * * *